(12) United States Patent
Geng

(10) Patent No.: US 11,556,333 B2
(45) Date of Patent: Jan. 17, 2023

(54) METHOD AND APPARATUS FOR PROCESSING AUDIO PROCESSING CHIP, AND ELECTRONIC DEVICE

(71) Applicant: Beijing Baidu Netcom Science and Technology Co., Ltd., Beijing (CN)

(72) Inventor: Lei Geng, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/030,525

(22) Filed: Sep. 24, 2020

(65) Prior Publication Data

US 2021/0286613 A1    Sep. 16, 2021

(30) Foreign Application Priority Data

Mar. 11, 2020   (CN) .......................... 202010165444.6

(51) Int. Cl.
    *G06F 9/44*        (2018.01)
    *G06F 8/654*       (2018.01)
    *G06F 3/16*        (2006.01)

(52) U.S. Cl.
    CPC ............. *G06F 8/654* (2018.02); *G06F 3/162* (2013.01)

(58) Field of Classification Search
    CPC ................................ G06F 3/162; G06F 8/654
    USPC .................................................. 717/168–178
    See application file for complete search history.

(56) References Cited

U.S. PATENT DOCUMENTS

| 6,640,334 | B1 * | 10/2003 | Rasmussen | ............... G06F 8/65 |
| | | | | 717/169 |
| 7,299,463 | B2 * | 11/2007 | Brannock | ............... G06F 8/654 |
| | | | | 717/169 |
| 7,623,853 | B2 * | 11/2009 | Vikse | ............... H04M 3/42178 |
| | | | | 455/410 |
| 8,924,952 | B1 | 12/2014 | Hou | |
| 2007/0035998 | A1 * | 2/2007 | Tamura | ................... G11C 16/06 |
| | | | | 365/185.03 |

(Continued)

FOREIGN PATENT DOCUMENTS

| CN | 110737455 A | 1/2020 |
| JP | 2001117779 A | 4/2001 |

(Continued)

OTHER PUBLICATIONS

Pekez et al., "Firmware Update Procedure for Audio Systems based on CS4953xx DSP family", 2018, IEEE, pp. 29-34. (Year: 2018).*

(Continued)

*Primary Examiner* — Ted T. Vo
(74) *Attorney, Agent, or Firm* — The Webb Law Firm

(57) ABSTRACT

A method and apparatus for processing an audio processing chip, and an electronic device are provided. A specific implementation of the method includes: controlling the audio processing chip to perform firmware updating, the firmware updating including: updating second firmware stored in a second storage area of the audio processing chip to target firmware, or storing the target firmware to an empty second storage area in the audio processing chip; in response to an abnormality being not present in the firmware updating, determining the target firmware as firmware to be run in the audio processing chip; and in response to an abnormality being present in the firmware updating, determining the first firmware as the firmware to be run in the audio processing chip.

16 Claims, 4 Drawing Sheets

(56) References Cited

U.S. PATENT DOCUMENTS

2007/0226334 A1\* 9/2007 Aoyagi .................. G06F 8/658
709/224

FOREIGN PATENT DOCUMENTS

| JP | 2002175193 A | 6/2002 |
|----|--------------|--------|
| JP | 2011128702 A | 6/2011 |
| JP | 2018190341 A | 11/2018 |
| JP | 2018207251 A | 12/2018 |

OTHER PUBLICATIONS

Jain et al., "Infield Firmware Update: Challenges and Solutions", International Conference on Communication and Signal Processing, Apr. 6-8, 2016, India, pp. 1232-1236.
Hirosato et al., "Secure MCU Platform Techniques to Ensure Security of Cyber-Physical Systems", Toshiba Review, 2019, pp. 1-14, vol. 74:6. [English-language Abstract].
Jain et al., "Infield Firmware Update: Challenges and Solutions", Proceedings of 2016 International Conference on Communication and Signal Processing, 2016, pp. 1232-1236.

\* cited by examiner

METHOD AND APPARATUS FOR PROCESSING AUDIO PROCESSING CHIP, AND ELECTRONIC DEVICE

CROSS-REFERENCE TO RELATED APPLICATIONS

This application claims priority to Chinese Patent Application No. 202010165444.6 filed Mar. 11, 2020, the disclosure of which is hereby incorporated by reference in its entirety.

TECHNICAL FIELD

The present disclosure relates to the speech processing technology in the field of computer technology, particularly to a method and apparatus for processing an audio processing chip, and an electronic device.

BACKGROUND

With the development of speech recognition technology, more and more electronic devices (e.g., mobile phones and smart sound boxes) have speech interaction functions. At present, the noise reduction for an audio signal is generally implemented by storing an audio signal noise reduction algorithm into an (front-end) audio processing chip in a form of firmware.

Here, in order to continuously improve the performance of the noise reduction for the audio signal, it is generally required to upgrade the firmware stored in the audio processing chip. However, in the process of upgrading the firmware stored in the audio processing chip, there may be an abnormality during the upgrade, and thus, the audio processing chip cannot work or works abnormally, thereby reducing the stability of the electronic device in performing speech processing.

SUMMARY

Embodiments of the present disclosure provide a method for processing an audio processing chip, an apparatus and an electronic device, to solve the problem of low stability of the electronic device in speech processing.

To solve the above technical problem, embodiments of the present disclosure implement follows:

In a first aspect, some embodiments of the present disclosure provide a method for processing an audio processing chip, applied to an electronic device including the audio processing chip, wherein a first storage area of the audio processing chip stores first firmware, and the method comprises:

controlling the audio processing chip to perform firmware updating, the firmware updating comprising: updating second firmware stored in a second storage area of the audio processing chip to target firmware, or storing the target firmware to an empty second storage area in the audio processing chip;

in response to an abnormality being not present in the firmware updating, determining the target firmware as firmware to be run in the audio processing chip; and in response to an abnormality being present in the firmware updating, determining the first firmware as the firmware to be run in the audio processing chip.

Alternatively, the controlling the audio processing chip to perform the firmware updating comprises:

performing erase processing on the second storage area;

where after controlling the audio processing chip to perform the firmware updating, the method further comprises:

in response to the erase processing being successful, determining an abnormality being not present in the firmware updating of the audio processing chip; and in response to the erase processing being not successful, determining an abnormality being present in the firmware updating of the audio processing chip.

Alternatively, the determining an abnormality being not present in the firmware updating of the audio processing chip in response to the erase processing being successful, comprises:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip, where after the controlling the audio processing chip to perform the firmware updating, the method further comprises:

in response to the writing for the target firmware failing or the target firmware not passing the validation, determining an abnormality being present in the firmware updating of the audio processing chip.

Alternatively, the audio processing chip comprises a flash storage device, the flash storage device being set with the first storage area and the second storage area.

Alternatively, the controlling the audio processing chip to perform the firmware updating comprises:

determining whether a version number of the target firmware is higher than version numbers of all firmware stored in the audio processing chip; and in response to the version number of the target firmware being higher than the version numbers of all the firmware stored in the audio processing chip, controlling the audio processing chip to perform the firmware updating.

In a second aspect, some embodiments of the present disclosure provide an electronic device, the electronic device include:

at least one processor; and a storage device, communicated with the at least one processor, where the storage device stores an instruction executable by the at least one processor, and the instruction is executed by the at least one processor, to enable the at least one processor to perform operations, the operations comprising:

controlling the audio processing chip to perform firmware updating, the firmware updating comprising: updating second firmware stored in a second storage area of the audio processing chip to target firmware, or storing the target firmware to an empty second storage area in the audio processing chip;

in response to an abnormality being not present in the firmware updating, determining the target firmware as firmware to be run in the audio processing chip; and in response to an abnormality being present in the firmware updating, determining the first firmware as the firmware to be run in the audio processing chip.

Alternatively, the controlling the audio processing chip to perform the firmware updating comprises:

performing erase processing on the second storage area;

where after controlling the audio processing chip to perform the firmware updating, the method further comprises:

in response to the erase processing being successful, determining an abnormality being not present in the firmware updating of the audio processing chip; and in response to the erase processing being not successful, determining an abnormality being present in the firmware updating of the audio processing chip.

Alternatively, the determining an abnormality being not present in the firmware updating of the audio processing chip in response to the erase processing being successful, comprises:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip, where after the controlling the audio processing chip to perform the firmware updating, the method further comprises:

in response to the writing for the target firmware failing or the target firmware not passing the validation, determining an abnormality being present in the firmware updating of the audio processing chip.

Alternatively, the audio processing chip comprises a flash storage device, the flash storage device being set with the first storage area and the second storage area.

Alternatively, the controlling the audio processing chip to perform the firmware updating comprises:

determining whether a version number of the target firmware is higher than version numbers of all firmware stored in the audio processing chip; and in response to the version number of the target firmware being higher than the version numbers of all the firmware stored in the audio processing chip, controlling the audio processing chip to perform the firmware updating.

In a third aspect, some embodiments of the present disclosure provide a non-transitory computer readable storage medium, storing a computer instruction, wherein the computer instruction is used to cause a computer to perform operations, the operations include:

controlling the audio processing chip to perform firmware updating, the firmware updating comprising: updating second firmware stored in a second storage area of the audio processing chip to target firmware, or storing the target firmware to an empty second storage area in the audio processing chip;

in response to an abnormality being not present in the firmware updating, determining the target firmware as firmware to be run in the audio processing chip; and in response to an abnormality being present in the firmware updating, determining the first firmware as the firmware to be run in the audio processing chip.

Alternatively, the controlling the audio processing chip to perform the firmware updating comprises:

performing erase processing on the second storage area;

where after controlling the audio processing chip to perform the firmware updating, the method further comprises:

in response to the erase processing being successful, determining an abnormality being not present in the firmware updating of the audio processing chip; and in response to the erase processing being not successful, determining an abnormality being present in the firmware updating of the audio processing chip.

Alternatively, the determining an abnormality being not present in the firmware updating of the audio processing chip in response to the erase processing being successful, comprises:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip, where after the controlling the audio processing chip to perform the firmware updating, the method further comprises:

in response to the writing for the target firmware failing or the target firmware not passing the validation, determining an abnormality being present in the firmware updating of the audio processing chip.

Alternatively, the audio processing chip comprises a flash storage device, the flash storage device being set with the first storage area and the second storage area.

Alternatively, the controlling the audio processing chip to perform the firmware updating comprises:

determining whether a version number of the target firmware is higher than version numbers of all firmware stored in the audio processing chip; and in response to the version number of the target firmware being higher than the version numbers of all the firmware stored in the audio processing chip, controlling the audio processing chip to perform the firmware updating.

In a fourth aspect, some embodiments of the present disclosure provide an apparatus for processing an audio processing chip, applied to an electronic device including an audio processing chip, where a first storage area of the audio processing chip stores first firmware, and the apparatus comprises:

an updating module, configured to control the audio processing chip to perform firmware updating, the firmware updating comprising: updating second firmware stored in a second storage area of the audio processing chip to target firmware, or storing the target firmware to an empty second storage area in the audio processing chip;

a first determining module, configured to determine the target firmware as firmware to be run in the audio processing chip in response to an abnormality being not present in the firmware updating; and a second determining module, configured to determine the first firmware as the firmware to be run in the audio processing chip in response to an abnormality being present in the firmware updating.

Alternatively, the updating module is configured to: perform erase processing on the second storage area, the apparatus further includes:

a third determining module, configured to determine an abnormality being not present in the firmware updating of the audio processing chip in response to the erase processing being successful; and a fourth determining module, configured to determine an abnormality being present in the firmware updating of the audio processing chip in response to the erase processing being not successful.

Alternatively, the third determining module includes:

a writing unit, configured to write the target firmware into the second storage area in response to the erase processing being successful;

a validating unit, configured to validate the target firmware written into the second storage area in response to the writing for the target firmware being successful; and a determining unit, configured to determine an abnormality being not present in the firmware updating of the audio processing chip in response to the target firmware passing the validation;

the apparatus further includes a fifth determining module, configured to determine an abnormality being present in the firmware updating of the audio processing chip in response to the writing of the target firmware failing or the target firmware not passing the validation.

Alternatively, the audio processing chip comprises a flash storage device, the flash storage device being provided with the first storage area and the second storage area.

Alternatively, the updating module includes:

a version number comparing unit, configured to determine whether a version number of the target firmware is higher than version numbers of all firmware stored in the audio processing chip; and an updating unit, configured to control the audio processing chip to perform the firmware updating in response to the version number of the target firmware being higher than the version numbers of all the firmware stored in the audio processing chip.

An embodiment of the present disclosure has following advantages and beneficial effect: an audio processing chip is controlled to perform firmware updating, the firmware updating including updating second firmware stored in a second storage area of the audio processing chip to target firmware, or storing the target firmware to an empty second storage area in the audio processing chip; firmware to be run in the audio processing chip is determined to be the target firmware, if an abnormality is not present during the firmware updating; and the firmware to be run in the audio processing chip is determined to be first firmware if an abnormality is present during the firmware updating. Here, since the technical means that pre-stored firmware is used to be the firmware to be run in the audio processing chip when an abnormality is present during the firmware updating is adopted, the present problem of low stability of the electronic device in performing speech processing is overcome, thereby improving the stability of the speech processing of the electronic device.

In addition, by automatically controlling the audio processing chip to perform a firmware upgrade in the situation where a version number of the target firmware for the updating is higher than a version number of all firmware stored in the audio processing chip, the operation convenience of the electronic device during the firmware upgrade is improved.

The flash storage device is provided with two partitions for respectively storing firmware, and thus, the efficiency of the firmware update processing may be improved.

It is determined that an abnormality is present during the firmware update processing, when any of the situations where erase processing performed on the second storage area is not successful, where writing of the target firmware is not successful, and where a the target firmware fails to pass the validation occurs, which makes the abnormality detection in the firmware updating more strict, thus further improving the stability of the speech processing of the electronic device.

Other effects of the above alternative implementations will be described hereinafter in combination with specific embodiments.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
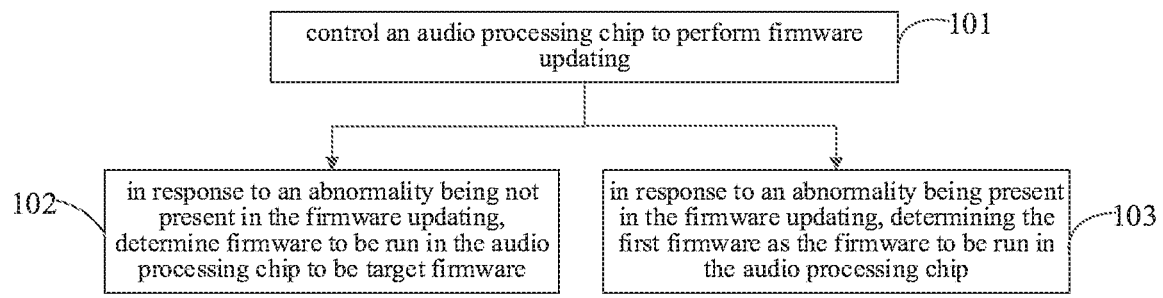
FIG. 1 is a schematic diagram according to a first embodiment of the present disclosure.

Referring to FIG. 1, an embodiment of the present disclosure provides a method for processing an audio processing chip. The method may be applied to an electronic device including an audio processing chip, and a first storage area of the audio processing chip stores first firmware. As shown in FIG. 1, the method for processing an audio processing chip includes the following steps:

Step 101, control the audio processing chip to perform firmware updating, the firmware updating comprising: updating second firmware stored in a second storage area of the audio processing chip to target firmware, or storing the target firmware to an empty second storage area in the audio processing chip;

Step 102, in response to an abnormality being not present in the firmware updating, determining the target firmware as firmware to be run in the audio processing chip; and Step 103, in response to an abnormality being present in the firmware updating, determining the first firmware as the firmware to be run in the audio processing chip.

Here, the firmware to be run in the audio processing chip is determined according to whether an abnormality is present in the firmware updating of the audio processing chip. That is, when an abnormality is not present in the firmware updating, the target firmware for the updating is determined to be the firmware to be run. When an abnormality is present in the firmware updating (e.g., an abnormality caused by power failure or a mis-operation), the first firmware backed up in advance is determined as the firmware to be run, to ensure the normal operation of the audio processing chip, thereby improving the stability of the speech processing of the electronic device.

In an embodiment of the present disclosure, the audio processing chip is mainly used as a chip processing an audio signal received by the electronic device (e.g., inputted by a user or sent by other electronic devices), and an audio processing algorithm in a form of firmware is preset in the audio processing chip. For example, the audio processing algorithm may be an audio signal noise reduction algorithm, etc.

Here, the audio processing chip is set with at least a first storage area and a second storage area. The first storage area pre-stores the first firmware. The second storage area may preset with the second storage area, or the second storage area may also be empty, that is, no firmware is stored in the second storage area. The second storage area is a storage area in which the firmware updating is performed.

It should be noted that in the situation where the second storage area is preset with a second firmware, the second firmware and the first firmware are firmware of the same audio processing algorithm, and the second firmware and the first firmware are firmware having the same version number or different version numbers. For example, when the electronic device initially leaves the factory, the first storage area and the second storage area in the audio processing chip may pre-store respectively firmware having the same version number. Alternatively, the first storage area in the audio processing chip may pre-store firmware 1, the second storage area may pre-store firmware 2, and the version number of the firmware 1 is different from that of the firmware 2.

In some implementations, the version number of the second firmware is lower than the version number of the first firmware, such that, in the situation where an abnormality is present during the updating, the electronic device may use firmware having a version number higher than a version number of the updated firmware as the firmware to be run of the audio processing chip, thereby improving the running performance of the audio processing chip.

In the step 101, the controlling the audio processing chip to perform firmware updating may refer to: in the situation where the second storage area stores the second firmware, updating the second firmware to the target firmware; or in the situation where the second storage area is empty, storing the target firmware into the second storage area.

Here, the updating the second firmware to the target firmware may refer to performing a version upgrade on the firmware stored in the second storage area, that is, replacing the second firmware with target firmware having a higher version number; or may refer to performing a version recovery on the firmware stored in the second storage area, for example, recovering the second firmware to firmware of a version prior to the last update, or to firmware having a version number lower than the version number of the second firmware.

In addition, the controlling the audio processing chip to perform firmware updating may refer to that, the electronic device may perform the firmware updating according to an operation inputted by the user. For example, in the situation where the user inputs an operation for instructing the electronic device to update the second firmware in the audio processing chip to firmware of a lower version, the electronic device controls the audio processing chip to perform the firmware updating.

The controlling the audio processing chip to perform firmware updating may also refer to that, the electronic device may be automatically triggered to control the audio processing chip to perform the firmware updating. For example, the audio processing chip is controlled to perform the firmware updating when a preset interval time is reached.

In some implementations, the step 101 may include:
determining whether a version number of the target firmware is higher than version numbers of all firmware stored in the audio processing chip; and
in response to the version number of the target firmware being higher than the version numbers of all the firmware stored in the audio processing chip, controlling the audio processing chip to perform the firmware updating.

Here, the electronic device may automatically control the audio processing chip to perform a firmware upgrading in the situation where the version number of the target firmware for the updating is higher than the version numbers of all the firmware stored in the audio processing chip, thereby improving the operation convenience of the electronic device during the firmware upgrade.

It should be noted that the target firmware may be firmware inputted to the electronic device and having the same algorithm as the second firmware, and the version number of the target firmware may be lower than, equal to, or higher than the version number of any firmware stored in the audio processing chip. When the version number of the target firmware is not higher than the version numbers of at least two pieces of firmware, for example, the target firmware is firmware 3, and the version number of the firmware 3 is higher than the version number of the firmware 2 but lower than the version number of the firmware 1, in this case, the electronic device may not perform the firmware updating.

In addition, in an embodiment of the present disclosure, the first storage area and the second storage area of the audio processing chip may be two storage devices (e.g., flash storage devices (flash)), respectively. The controlling the audio processing chip to perform firmware updating may be understood as performing erase on the storage device corresponding to the second storage area and writing the target firmware therein.

Alternatively, in some implementations, the audio processing chip includes a flash storage device set with the first storage area and the second storage area.

Here, one flash storage device is set with two partitions for respectively storing firmware, and thus, the efficiency of the firmware updating may be improved.

In the step 101, the electronic device controls the audio processing chip to perform the firmware updating may include at least one of: performing, on the second storage area, erase processing, writing the target firmware, or validating the written target firmware.

In addition, when the electronic device controls the audio processing chip to perform at least one of the processes of performing, on the second storage area, erase processing, writing the target firmware, or validating the written target firmware, the electronic device performs an abnormality detection during the firmware updating, that is, determines whether an abnormality is present in the firmware updating.

In some implementations, the step 101 may include:
performing erase processing on the second storage area.
After the step 101, the method further includes:
in response to the erase processing being successful, determining an abnormality being not present in the firmware updating of the audio processing chip; and in response to the erase processing being not successful, determining an abnormality being present in the firmware updating of the audio processing chip.

Here, the electronic device may determine whether an abnormality is present in the firmware updating according to whether the erase processing performed on the second storage area is successful. That is, the electronic device determines that an abnormality is not present in the firmware updating if the erase processing is successful, and determines that an abnormality is present in the firmware updating if the erase processing is not successful, such that the process of the abnormality detection during the firmware updating is strict, thus improving the stability of the electronic device in performing the speech processing.

In this embodiment, the performing erase processing on the second storage area may refer to that the second firmware is erased when second storage area stores the second firmware; or that an erase operation such as formatting is performed on the second storage area when the second storage area is empty.

It should be noted that, the electronic device detects an abnormality during the firmware updating may refer to only detecting whether the second storage area is erased successfully; or may refer to performing abnormality detection on other firmware updating processes.

In a further implementation, the determining an abnormality being not present during the firmware updating of the audio processing chip if the erase processing is successful may include:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip.

After the step 101, the method further includes:

in response to the writing for the target firmware failing or the target firmware not passing the validation, determining an abnormality being present in the firmware updating of the audio processing chip.

Here, the electronic device detects an abnormality during the firmware updating may further include detecting whether the writing of the firmware is successful and validating the written firmware, such that it is determined that an abnormality is not present during the firmware updating only in the situation where the erase processing performed on the second storage area is successful, the writing of the target firmware is successful and the target firmware passes the validation. It is determined that an abnormality is present during the firmware updating when any of the situations where the erase processing on the second storage area is not successful, the writing of the target firmware is not successful and the target firmware does not pass the validation occurs, which makes the abnormality detection during the firmware updating more strict, thus further improving the stability of the speech processing of the electronic device.

In the step 102, in the situation where the electronic device determines that an abnormality is not present during the firmware updating of the audio processing chip, the electronic device may determine the firmware to be run in the audio processing chip to be the target firmware, such that the audio processing chip may start the target firmware to perform audio signal processing after the updating of the audio processing chip is completed and the audio processing chip is powered on again or the audio processing chip is reset.

However, in the step 103, in the situation where the electronic device determines that there is an abnormality during the firmware updating of the audio processing chip, the electronic device may determine the firmware to be run in the audio processing chip to be the first firmware backed up (i.e., stored) in advance, such that the audio processing chip may start the first firmware to perform the audio signal processing after the updating of the audio processing chip is completed and the audio processing chip is powered on again or the audio processing chip is reset. Thus, the situation where the audio processing chip cannot normally operate due to an abnormality in the firmware updating is avoided.

In order to facilitate understanding the method for processing an audio processing chip, in an embodiment of the present disclosure, the process of the method for processing an audio processing chip in practical applications is exemplified as follows:

Here, the Flash of the audio processing chip has a partition 1 (i.e., the first storage area) and a partition 2 (i.e., the second storage area). The partition 1 stores a piece of firmware, and the partition 2 is empty or also stores a piece of firmware. When the partition 2 stores a piece of firmware, the version number of the firmware stored in the partition 2 is lower than the version number of the firmware stored in the partition 1.

In the situation where it is required to upgrade the firmware in the audio processing chip, that is, it is required to upgrade the firmware stored in the audio processing chip to firmware having a higher version number, the electronic device may perform the following firmware upgrade:

powering on the audio processing chip;

comparing a version number of burning firmware (i.e., the target firmware) with version number of all firmware in the Flash; ending the upgrade when the version number of the burning firmware is lower than a version number of at least one piece of firmware in the Flash (e.g., lower than the version number of the firmware stored in partition 1 when partition 2 is empty; or lower than the version number of the firmware stored in at least one of the partition 1 or the partition 2 when the partition 2 stores a piece of the firmware); and entering a burning mode when the version number of the burning firmware is higher than the version number of all the firmware in the Flash; and after entering the burning mode, erasing firmware having a low version number or an empty partition (i.e., erasing the partition 2) in the Flash; if the erasing fails (e.g., power failure during the erasing or other mis-operations), starting backup firmware of a newer version (i.e., firmware stored in partition 1) stored in the partition 1 and the partition 2 in the Flash after the audio processing chip is powered on again or reset; and if the erasing is successful, writing the burning firmware into the erased partition;

if a problem occurs during the writing or the writing fails (e.g., power failure during the writing or other mis-operations), starting the backup firmware of the newer version (i.e., the firmware stored in partition 1) stored in the partition 1 and the partition 2 in the Flash after the audio processing chip is powered on again or reset; and if the writing is successful, performing a firmware validation on the burning firmware;

if the firmware validation fails (e.g., power failure during the firmware verification or other mis-operations), starting the backup firmware of the newer version (i.e., the firmware stored in partition 1) stored in the partition 1 and the partition 2 in the Flash after the audio processing chip is powered on again or reset; and if the firmware validation is successful, starting burning firmware newly written into the partition 2, after the audio processing chip is powered on again or reset.

Figure 2:
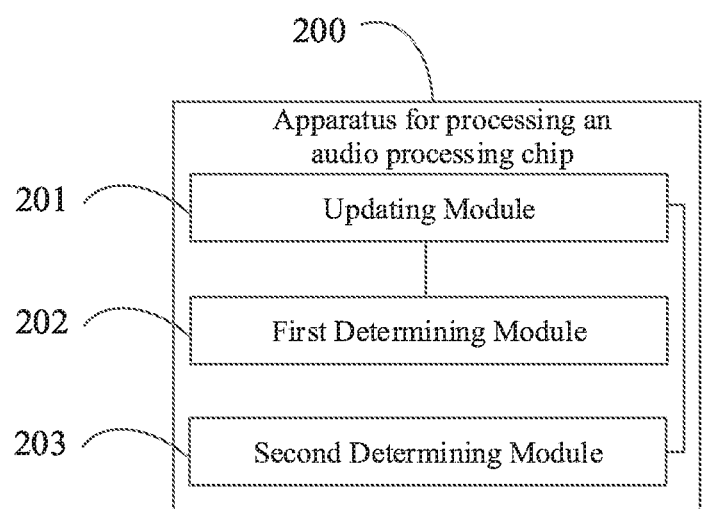
FIG. 2 is one of the schematic diagrams of a second embodiment of the present disclosure.

Referring to FIG. 2, an embodiment of the present disclosure provides an apparatus for processing an audio processing chip. The apparatus is applied to an electronic device including an audio processing chip, and a first storage area of the audio processing chip stores first firmware. As shown in FIG. 2, the apparatus 200 for processing an audio processing chip includes:

an updating module 201, configured to control the audio processing chip to perform firmware updating, the firmware updating comprising: updating second firmware stored in a second storage area of the audio processing chip to target firmware, or storing the target firmware to an empty second storage area in the audio processing chip;

a first determining module 202, configured to determine the target firmware as firmware to be run in the audio processing chip in response to an abnormality being not present in the firmware updating; and a second determining module 203, configured to determine the first firmware as the firmware to be run in the audio processing chip in response to an abnormality being present in the firmware updating.

Figure 3:
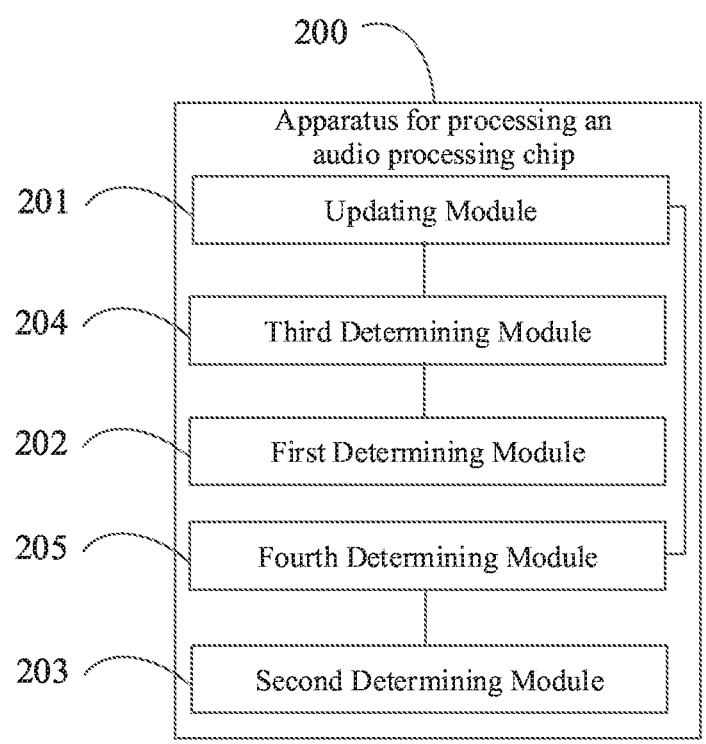
FIG. 3 is one of the schematic diagrams of the second embodiment of the present disclosure.

Alternatively, the updating module is configured to:
perform erase processing on the second storage area.
As shown in FIG. 3, the apparatus 200 further includes:
a third determining module 204, configured to determine an abnormality being not present in the firmware updating of the audio processing chip in response to the erase processing being successful; and a fourth determining module 205, configured to determine an abnormality being present in the firmware updating of the audio processing chip in response to the erase processing being not successful.

Figure 4:
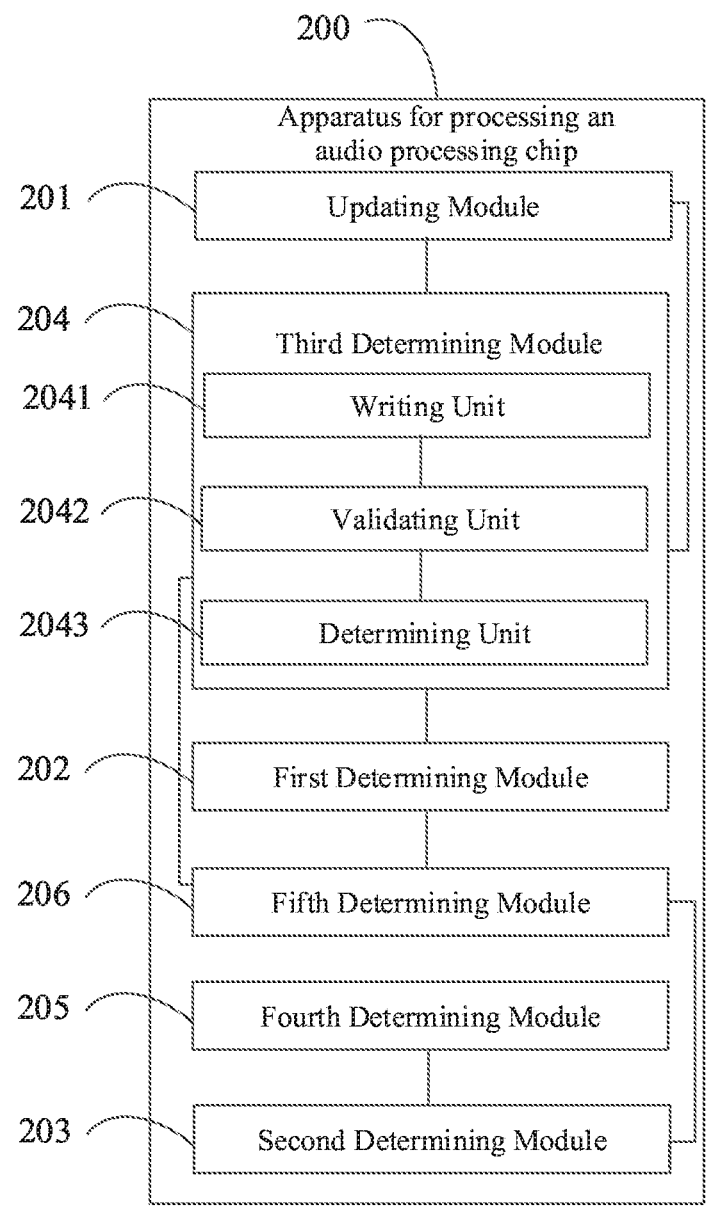
FIG. 4 is one of the schematic diagrams of the second embodiment of the present disclosure.

Alternatively, as shown in FIG. 4, the third determining module 204 includes:

a writing unit 2041, configured to write the target firmware into the second storage area in response to the erase processing being successful;

a validating unit 2042, configured to validate the target firmware written into the second storage area in response to the writing for the target firmware being successful; and a determining unit 2043, configured to determine an abnormality being not present in the firmware updating of the audio processing chip in response to the target firmware passing the validation.

The apparatus 200 further includes:
a fifth determining module 206, configured to determine an abnormality being present in the firmware updating of the audio processing chip in response to the writing of the target firmware failing or the target firmware not passing the validation.

Alternatively, the audio processing chip includes a flash storage device, the flash storage device being provided with the first storage area and the second storage area.

Figure 5:
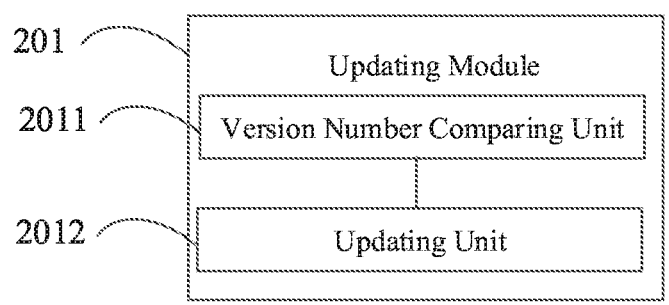
FIG. 5 is one of the schematic diagrams of the second embodiment of the present disclosure.

Alternatively, as shown in FIG. 5, the updating module 201 includes:

a version number comparing unit 2011, configured to determine whether a version number of the target firmware is higher than version numbers of all firmware stored in the audio processing chip; and an updating unit 2012, configured to control the audio processing chip to perform the firmware updating in response to the version number of the target firmware being higher than the version numbers of all the firmware stored in the audio processing chip.

It should be noted that the apparatus 200 for processing an audio processing chip can implement the various processes implemented by the server in method embodiments of the present disclosure illustrated in FIG. 1 and achieve the same beneficial effects, which will not be repeatedly described here, to avoid repetition.

According to embodiments of the present disclosure, an electronic device and a readable storage medium are provided.

Figure 6:
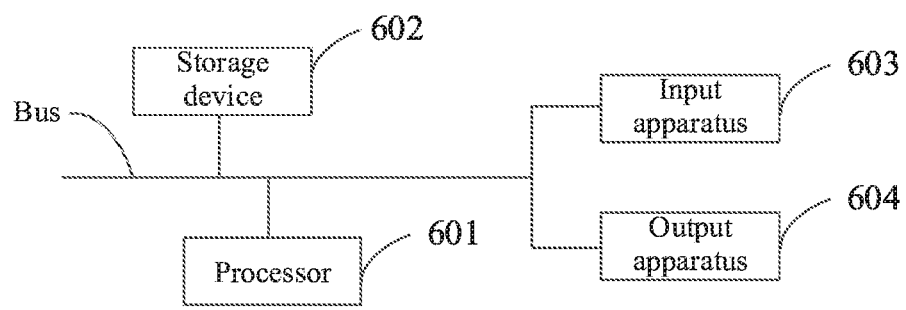
FIG. 6 is a block diagram of an electronic device adapted to implement a method for processing an audio processing chip according to embodiments of the present disclosure.

As shown in FIG. 6, FIG. 6 is a block diagram of an electronic device of a method for processing an audio processing chip (e.g., the method for processing an audio processing chip shown in FIG. 1) according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device includes one or more processors 601, a storage device 602, and an interface for connecting parts, the interface including a high speed interface and a low speed interface. The parts are interconnected using different buses, and may be mounted on a common motherboard or in other ways as needed. The processors may process an instruction executed within the electronic device, the instruction including an instruction stored in the storage device or on the storage device to display graphical information of a GUI on an external input/output apparatus such as a display device coupled to the interface. In other implementations, a plurality of processors and/or a plurality of buses may be used, if desired, along with a plurality of storage devices and a plurality of storage devices. Also, a plurality of electronic devices may be connected, and each device provides a portion of necessary operations (e.g., as a server array, a group of blade servers or a multi-processor system). In FIG. 6, one processor 601 is taken as an example.

The storage device 602 is a non-transitory computer readable storage medium provided in the present disclosure. Here, the storage device stores an instruction executable by at least one processor, to cause the at least one processor to perform the method for processing an audio processing chip provided in the present disclosure. The non-transitory computer readable storage medium in the present disclosure stores a computer instruction, the computer instruction being used to cause a computer to perform the method for processing an audio processing chip (e.g., the method for processing an audio processing chip shown in FIG. 1) provided in the present disclosure.

As the non-transitory computer readable storage medium, the storage device 602 may be used to store a non-transitory software program, a non-transitory computer executable program and a module such as a program instruction/module (e.g., the updating module 201, the first determining module 202 and the second determining module 203 shown in FIG. 2) corresponding to the method for processing an audio processing chip in the embodiments of the present disclosure. The processor 601 executes various functional applications and data processing of the server by running the non-transitory software program, the instruction and the module stored in the storage device 602, i.e., implements the method for processing an audio processing chip in the above embodiment of the method shown in FIG. 1.

The storage device 602 may include a storage program area and a storage data area. Here, the storage program area may store an operating system and an application program required for at least one function. The storage data area may store data, etc. created according to the use of the electronic device processed by an applet. In addition, the storage device 602 may include a high speed random access memory, and may also include a non-transitory storage device, for example, at least one magnetic disk storage device, a flash storage device, or other non-transitory solid state storage devices. In some embodiments, the storage device 602 may alternatively include a storage device disposed remotely relative to the processor 601. The remote storage device may be connected to the electronic device processed by the applet via a network. Examples of such network include, but not limited to, the Internet, an enterprise intranet, a local area network, a mobile communication network, and a combination thereof.

The electronic device of the method for processing an audio processing chip may further include: an input apparatus 603 and an output apparatus 604. The processor 601, the storage device 602, the input apparatus 603 and the output apparatus 604 may be connected via a bus or in other ways. In FIG. 6, the connection via a bus is taken as an example.

The input apparatus 603 may receive an inputted number or inputted character information, and generate a key signal input related to the user setting and functional control of the electronic device processed by the applet. For example, the input apparatus is a touch screen, a keypad, a mouse, a track pad, a touch pad, a pointing stick, one or more mouse buttons, a track ball, a joystick, or the like. The output apparatus 604 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including an acoustic input, a speech input, or a tactile input.

The systems and techniques described here may be implemented in a computing system (e.g., as a data electronic device) that includes a backend part, implemented in a computing system (e.g., an application electronic device) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the Internet.

The computer system may include a client and an electronic device. The client and the electronic device are generally remote from each other and typically interact through the communication network. The relationship between the client and the electronic device is generated through computer programs running on the respective computer and having a client-electronic device relationship to each other.

The technical solution of the embodiments of the present disclosure has the following advantages or beneficial effects: an audio processing chip is controlled to perform firmware updating, the firmware updating including updating second firmware stored in a second storage area of the audio processing chip to target firmware, or storing the target firmware to an empty second storage area in the audio processing chip; firmware to be run in the audio processing chip is determined to be the target firmware, if an abnormality is not present during the firmware updating; and the firmware to be run in the audio processing chip is determined to be first firmware if an abnormality is present during the firmware updating. Here, since the technical means that pre-stored firmware is used to be the firmware to be run in the audio processing chip when an abnormality is present during the firmware updating is adopted, the present problem of low stability of the electronic device in performing speech processing is overcome, thereby improving the stability of the speech processing of the electronic device.

In addition, by automatically controlling the audio processing chip to perform a firmware upgrade in the situation where a version number of the target firmware for the updating is higher than a version number of all firmware stored in the audio processing chip, the operation convenience of the electronic device during the firmware upgrade is improved.

The flash storage device is provided with two partitions for respectively storing firmware, and thus, the efficiency of the firmware update processing may be improved.

It is determined that an abnormality is present during the firmware update processing, when any of the situations where erase processing performed on the second storage area is not successful, where writing of the target firmware is not successful, and where a the target firmware fails to pass the validation occurs, which makes the abnormality detection in the firmware updating more strict, thus further improving the stability of the speech processing of the electronic device.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

The above embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for processing an audio processing chip, applied to an electronic device including the audio processing chip, wherein a first storage area of the audio processing chip stores first firmware, and the method comprises:
    controlling the audio processing chip to perform firmware updating, the firmware updating comprising: updating second firmware stored in a second storage area of the audio processing chip to target firmware, or storing the target firmware to an empty second storage area in the audio processing chip, wherein the second storage area is different from the first storage area and is used for performing the firmware updating, and wherein the first firmware, the second firmware, and the target firmware are firmware for the same audio processing algorithm, and a version of the target firmware is different from a version of any one of the first firmware and the second firmware;
    in response to an abnormality or failure being not present in an erasoing process, a writing process, or a verifying process in the firmware updating, determining the target firmware as firmware to be run in the audio processing chip, and remaining the first firmware stored in the first storage area of the audio processing chip; and
    in response to an abnormality or failure being present in the erasing process, the writing process, or the verifying process in the firmware updating, determining the first firmware as the firmware to be run in the audio processing chip.

2. The method according to claim 1, wherein the controlling the audio processing chip to perform the firmware updating comprises:
    performing erase processing on the second storage area;
    wherein after controlling the audio processing chip to perform the firmware updating, the method further comprises:
    in response to the erase processing being successful, determining an abnormality being not present in the firmware updating of the audio processing chip; and
    in response to the erase processing being not successful, determining an abnormality being present in the firmware updating of the audio processing chip.

3. The method according to claim 2, wherein the determining an abnormality being not present in the firmware updating of the audio processing chip in response to the erase processing being successful, comprises:
    in response to the erase processing being successful, writing the target firmware into the second storage area;
    in response to the writing for the target firmware being successful, validating the target firmware written into the second storage area; and
    in response to the target firmware passing the validation, determining an abnormality being not present in the firmware updating of the audio processing chip,
    wherein after the controlling the audio processing chip to perform the firmware updating, the method further comprises:
    in response to the writing for the target firmware failing or the target firmware not passing the validation, determining an abnormality being present in the firmware updating of the audio processing chip.

4. The method according to claim 1, wherein the audio processing chip comprises a flash storage device, the flash storage device being set with the first storage area and the second storage area.

5. The method according to claim 1, wherein the controlling the audio processing chip to perform the firmware updating comprises:
    determining whether a version number of the target firmware is higher than version numbers of all firmware stored in the audio processing chip; and
    in response to the version number of the target firmware being higher than the version numbers of all the firmware stored in the audio processing chip, controlling the audio processing chip to perform the firmware updating.

6. The method according to claim 5, wherein the controlling the audio processing chip to perform the firmware updating comprises:
    determining whether a version number of the target firmware is lower than version numbers of all firmware stored in the audio processing chip, in response to a recovery instruction; and
    in response to the version number of the target firmware being lower than the version numbers of all the firmware stored in the audio processing chip, controlling the audio processing chip to perform the firmware updating.

7. An electronic device, comprising:
    at least one processor; and
    a storage device, communicated with the at least one processor,
    wherein the storage device stores an instruction executable by the at least one processor, and the instruction is executed by the at least one processor, to enable the at least one processor to perform operations, the operations comprising:
    controlling the audio processing chip to perform firmware updating, the firmware updating comprising: updating second firmware stored in a second storage area of the audio processing chip to target firmware, or storing the target firmware to an empty second storage area in the audio processing chip, wherein the second storage area is different from the first storage area and is used for performing the firmware updating, and wherein the first firmware, the second firmware, and the target firmware are firmware for the same audio processing algorithm, and a version of the target firmware is different from a version of any one of the first firmware and the second firmware;

in response to an abnormality or failure being not present in an erasing process, a writing process, or a verifying process in the firmware updating, determining the target firmware as firmware to be run in the audio processing chip, and remaining the first firmware stored in the first storage area of the audio processing chip; and in response to an abnormality or failure being present in the erasing process, the writing process, or a verifying process in the firmware updating, determining the first firmware as the firmware to be run in the audio processing chip.

8. The electronic device according to claim 7, wherein the controlling the audio processing chip to perform the firmware updating comprises:

performing erase processing on the second storage area;

wherein after controlling the audio processing chip to perform the firmware updating, the operations further comprise:

in response to the erase processing being successful, determining an abnormality being not present in the firmware updating of the audio processing chip; and in response to the erase processing being not successful, determining an abnormality being present in the firmware updating of the audio processing chip.

9. The electronic device according to claim 8, wherein the determining an abnormality being not present in the firmware updating of the audio processing chip in response to the erase processing being successful, comprises:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip, wherein after the controlling the audio processing chip to perform the firmware updating, the operations further comprise:

in response to the writing for the target firmware failing or the target firmware not passing the validation, determining an abnormality being present in the firmware updating of the audio processing chip.

10. The electronic device according to claim 7, wherein the audio processing chip comprises a flash storage device, the flash storage device being set with the first storage area and the second storage area.

11. The electronic device according to claim 7, wherein the controlling the audio processing chip to perform the firmware updating comprises:

determining whether a version number of the target firmware is higher than version numbers of all firmware stored in the audio processing chip; and in response to the version number of the target firmware being higher than the version numbers of all the firmware stored in the audio processing chip, controlling the audio processing chip to perform the firmware updating.

12. A non-transitory computer readable storage medium, storing a computer instruction, wherein the computer instruction is used to cause a computer to perform operation, the operations comprising:

controlling the audio processing chip to perform firmware updating, the firmware updating comprising: updating second firmware stored in a second storage area of the audio processing chip to target firmware, or storing the target firmware to an empty second storage area in the audio processing chip, wherein the second storage area is different from the first storage area and is used for performing the firmware updating, and wherein the first firmware, the second firmware, and the target firmware are firmware for the same audio processing algorithm, and a version of the target firmware is different from a version of any one of the first firmware and the second firmware;

in response to an abnormality or failure being not present in an erasing process, a writing process, or a verifying process in the firmware updating, determining the target firmware as firmware to be run in the audio processing chip, and remaining the first firmware stored in the first storage area of the audio processing chip; and in response to an abnormality or failure being present in the erasing process, the writing process, or the verifying process in the firmware updating, determining the first firmware as the firmware to be run in the audio processing chip.

13. The storage medium according to claim 12, wherein the controlling the audio processing chip to perform the firmware updating comprises:

performing erase processing on the second storage area;

wherein after controlling the audio processing chip to perform the firmware updating, the operations further comprise:

in response to the erase processing being successful, determining an abnormality being not present in the firmware updating of the audio processing chip; and in response to the erase processing being not successful, determining an abnormality being present in the firmware updating of the audio processing chip.

14. The storage medium according to claim 13, wherein the determining an abnormality being not present in the firmware updating of the audio processing chip in response to the erase processing being successful, comprises:

in response to the erase processing being successful, writing the target firmware into the second storage area;

in response to the writing for the target firmware being successful, validating the target firmware written into the second storage area; and in response to the target firmware passing the validation, determining an abnormality being not present in the firmware updating of the audio processing chip, wherein after the controlling the audio processing chip to perform the firmware updating, the operations further comprise:

in response to the writing for the target firmware failing or the target firmware not passing the validation, determining an abnormality being present in the firmware updating of the audio processing chip.

15. The storage medium according to claim 12, wherein the audio processing chip comprises a flash storage device, the flash storage device being set with the first storage area and the second storage area.

16. The storage medium according to claim 12, wherein the controlling the audio processing chip to perform the firmware updating comprises:
- determining whether a version number of the target firmware is higher than version numbers of all firmware stored in the audio processing chip; and
- in response to the version number of the target firmware being higher than the version numbers of all the firmware stored in the audio processing chip, controlling the audio processing chip to perform the firmware updating.

* * * * *

UNITED STATES PATENT AND TRADEMARK OFFICE
CERTIFICATE OF CORRECTION

PATENT NO. : 11,556,333 B2
APPLICATION NO. : 17/030525
DATED : January 17, 2023
INVENTOR(S) : Lei Geng It is certified that error appears in the above-identified patent and that said Letters Patent is hereby corrected as shown below:

In the Claims

Column 15, Line 54, Claim 1, delete "erasoing" and insert -- erasing --

Column 17, Line 20, Claim 7, delete "a" and insert -- the --

Signed and Sealed this
Seventh Day of March, 2023

Katherine Kelly Vidal
*Director of the United States Patent and Trademark Office*